Aug. 2, 1927.   1,637,597
G. J. ULRICI
APPARATUS FOR CLEANING, COLLECTING, OR SEPARATING GASES
Filed July 21, 1920     2 Sheets-Sheet 1

INVENTOR:
GERARDUS JACOBUS ULRICI
BY Frank L. Sessions
ATTORNEY

Aug. 2, 1927. 1,637,597
G. J. ULRICI
APPARATUS FOR CLEANING, COLLECTING, OR SEPARATING GASES
Filed July 21, 1920   2 Sheets-Sheet 2
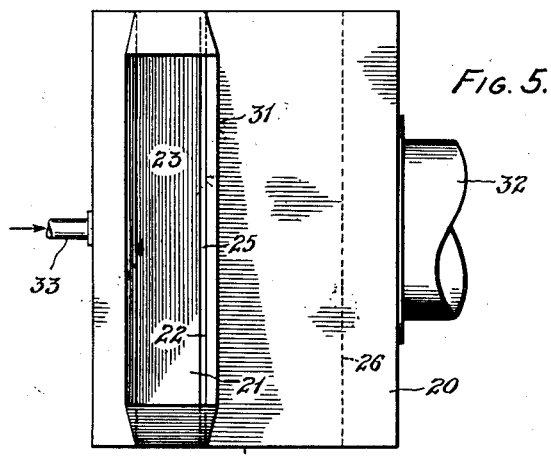
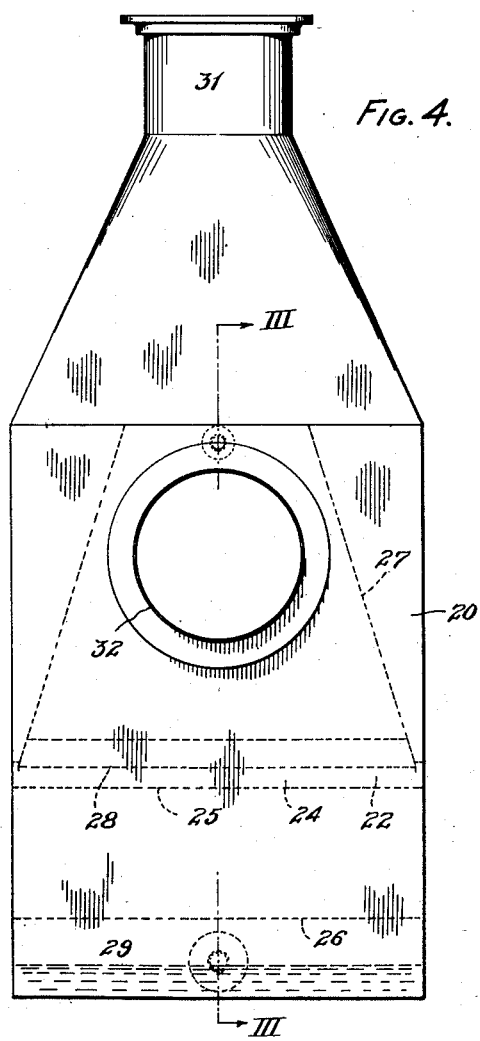
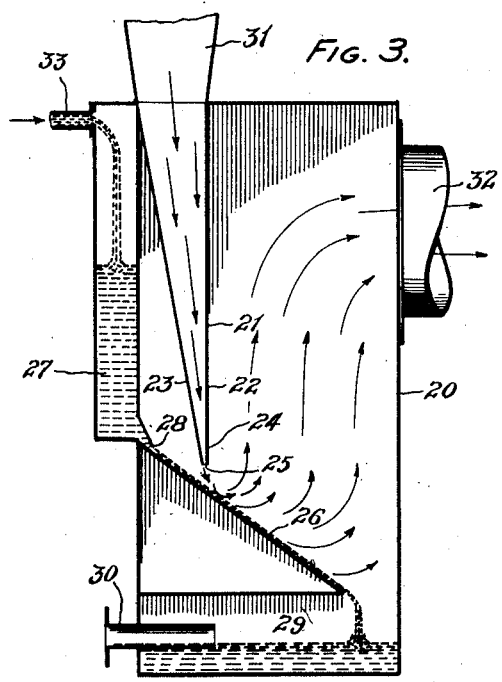
INVENTOR:
GERARDUS JACOBUS ULRICI
BY
ATTORNEY Patented Aug. 2, 1927.

1,637,597

UNITED STATES PATENT OFFICE.

GERARDUS JACOBUS ULRICI, OF DUSSELDORF, GRAFENBERG, GERMANY.

APPARATUS FOR CLEANING, COLLECTING, OR SEPARATING GASES.

Application filed July 21, 1920, Serial No. 397,979, and in Germany December 23, 1919.

My invention relates particularly to that class of apparatus known generally as gas-cleaners. The objects of my invention are to provide new and useful apparatus for cleaning gases by the continuous removal therefrom of particles of foreign matter carried by them; the provision of new and useful apparatus for separating one gas from a mixture thereof of one or more other gases; and the provision of new and useful apparatus for collecting gas by causing it to form either a mechanical or chemical solution with a liquid. These and other objects of my invention are attained by following the methods described herein and with the use of the apparatus shown in the accompanying drawings and also described in these specifications.

In the drawings Fig. 1 is a vertical section of an apparatus embodying my invention and suitable for carrying out the methods thereof;

Fig. 3 is a vertical section of another form of apparatus embodying my invention this section being taken upon line III—III of Fig. 4;

Fig. 4 is an elevation of the discharge side of the apparatus shown in Fig. 3; and Fig. 5 is a top plan view of the apparatus shown in Figs. 3 and 4.

Figure 2:
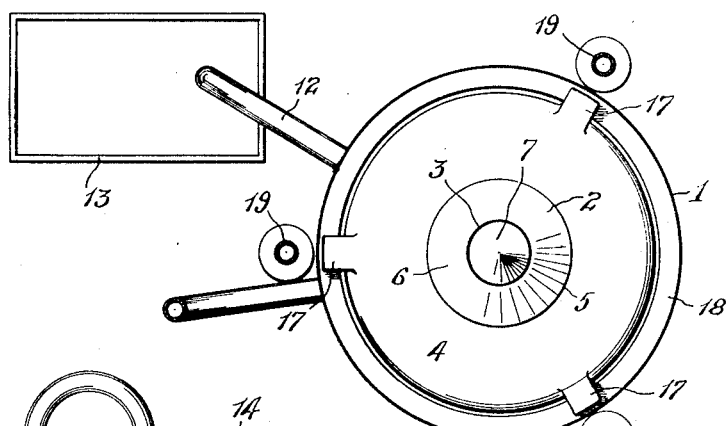
Fig. 2 is a plan section on line II—II of Fig. 1.

Apart from the regular wet gas-and-air-washers or cleaners most apparatus now used for the purpose of separating particles of foreign materials from gases employing a liquid as a detaining or binding medium is constructed in one of the two following manners:

The gas to be cleaned on entering the apparatus is either sub-divided into a number of thin currents which are projected vertically against a horizontal surface of relatively deep water, or, it passes in an undivided stream along or against moistened surfaces or baffles.

In the first case the level of the water is immediately destroyed through the impact of the gas thus creating whirls and eddies which prevent many of the particles of foreign materials from coming into contact with the water, thereby interfering with the cleaning process and rendering it inefficient.

In the second case, where the gases in streams of large cross section merely pass along or against moistened surfaces or baffles, only so much of the foreign material carried by the gas is separated as settles upon or contacts with the moistened surfaces. In this case a large proportion of the gas fails to come into contact with the moistened surfaces so that this apparatus also can accomplish only a partial cleaning of the gases passing through it.

To overcome the objections and difficulties encountered in the use of other gas cleaners with which I am familiar I have devised methods and apparatus by the use of which all parts of the uncleaned gases are brought into contact with the moistened surface of a plate or baffle whereby foreign materials carried by the gases are caught and detained by the moisture upon the surface while the gases pass on their way. By causing fresh liquid to flow over the collecting surface, which is preferably inclined or vertical, the foreign materials are continuously washed off from the surface and a fresh supply of liquid is continuously presented to the oncoming stream of uncleaned gas. It is evident that the smaller the jet or the thinner the veil of uncleaned gas coming into contact with the collecting surface the more efficient will be the removal of the foreign materials from the gas by detention by the liquid upon the collecting surface.

I have found that very high percentages of the foreign materials carried by gases can be removed by the use of my methods and apparatus in which the uncleaned gas is first sub-divided into small jets, or, preferably, wide, thin blasts such as emanate from narrow slits, so that no part of the moving stream of gas fails to impinge upon the moistened surface. In this manner the cleaning of the gas is uniform and efficient.

The gas current should preferably be made to impinge at an oblique angle upon the collecting plate so that the gas, after striking the surface and depositing in the detaining liquid the foreign materials which it has brought with it, may pass on without disturbing the direction of the incoming current of uncleaned gas.

It will be apparent to those skilled in the art that my invention is also adapted to accomplish the separation of gases, or, the collection of gas in the liquid employed for moistening the collecting surfaces. For instance, if it is desired to separate one gas from a mixture thereof of two or more gases, a liquid may be employed for moistening the collecting surfaces which is either a collector or has a chemical affinity for the gas which it is desired to separate from the mixture. By using the apparatus in the manner described for its use in the separation of foreign materials from gas the removal of one gas from the mixture of gases may be accomplished.

The collection of a single gas may be accomplished in accordance with my invention by the use of a liquid for moistening the collecting surfaces which is either a collector or has a chemical affinity for the gas which is caused to impinge upon the moistened surfaces.

In my prior Patent No. 1,147,463 I have shown and described a steam purifier so constructed as to permit all particles of steam to strike a baffle with full force, creating upon this baffle a flow of condensed water which carries with it all solid particles contained in the incoming steam while the steam is deflected from the baffle plate and passes on its way.

To make this apparatus suitable for cleaning dry gases or to separate or collect gases I have provided, in the present invention, apparatus similar in some features to that shown in my prior patent mentioned above and in addition have provided for the continuous flow of a thin film or sheet of water or other liquid over the collecting surfaces.

Figure 1:
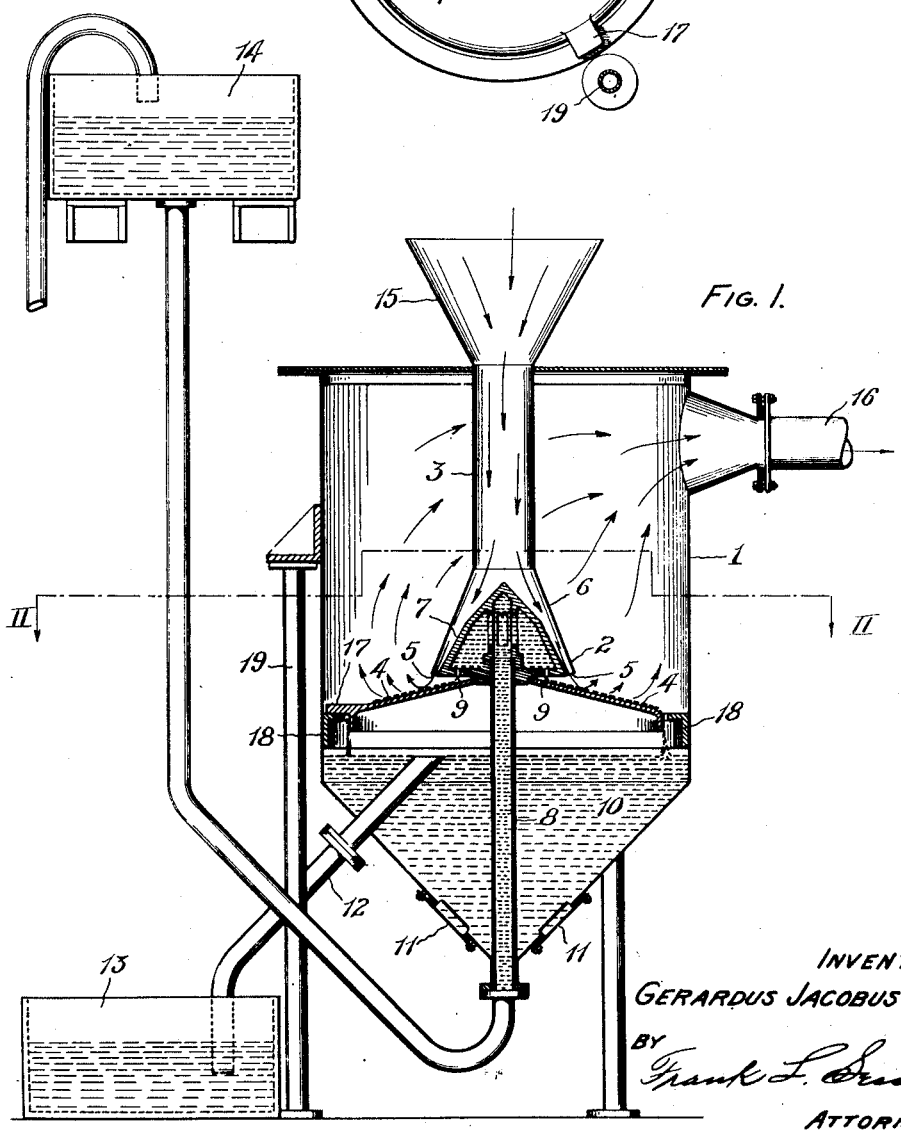

Referring to the drawings, 1 represents a vessel or container in which there is arranged a distributing device, 2, for the uncleaned air or other gases which enter the container through inlet pipe, 3. Beneath the distributing device, 2, is a collecting or baffle plate, 4, the surface of which makes an oblique angle with the current of gas which emanates from the nozzle, 5, of the distributing device. The cross sectional area of the container, 1, is preferably made considerably larger than that of the inlet pipe, 3, in order that the gases which are deflected from the collecting plate, 4, shall not be caused to return again into the path of the incoming uncleaned gas, and further, in order that the velocity of the gases impinging upon the collecting plate may be immediately reduced. The distributing device, 2, shown in Fig. 1 consists of a conical shell, 6, within and concentric with which there stands another conical member, 7, slightly smaller in its greatest diameter than the internal diameter of the shell, 6, so that an annular space or nozzle, 5, is formed all around the lower edge of the distributing device. Through this nozzle the uncleaned gases are directed in a thin blast upon the collecting plate. Instead of an annular slot a plurality of small apertures may be employed as nozzles.

The conical member, 7, is preferably made hollow and has connected to it the water or other liquid inlet pipe, 8. Apertures, 9, in the base of the liquid distributing member, 7, permit the continuous flow of liquid upon the collecting plate, 4, over which the liquid runs in a thin film or sheet and collects in the lower portion, 10, of the container, 1, which constitutes a catch basin for the foreign materials extracted from the gases. The apertures, 9, may be a series of small perforations in close proximity to each other or may consist of narrow annular slits or other shaped holes as circumstances may require. Clean-out holes having removable covers, 11—11, may be provided in the lower part of the wall of the catch basin, 10. An overflow pipe, 12, is shown for conducting the liquid away from the catch basin. This liquid may be recovered in a tank or other receptacle such as 13. The level of the liquid in the tank, 13, being always maintained above the discharge end of pipe, 12, a suitable liquid seal is thereby provided to prevent the escape of gas from the container, 1, through the liquid overflow pipe, 12. The liquid recovered in tank 13 may be recirculated through the cleaner if desired. In order that a uniform head of liquid may be maintained at the orifices, 9, of the liquid distributing member, a constant level supply tank, 14, may be provided.

The entering gases may be brought to the device through any convenient conducting means to the intake, 15, and the cleaned gases may be conducted to any desired point through the outlet or discharge pipe, 16. The collecting or baffle plate, 4, may be supported by lugs, 17, which may be made to rest upon an annular ledge or bracket, 18. Any convenient means for supporting the container, 1, such as the posts, 19, may be employed.

In Figs. 3, 4 and 5 there is shown a form of apparatus in which the vessel or container, 20, is rectangular in cross section and the distributing device, 21, is made of flat plates, 22, 23, separated at their bottom edges so that the orifice of the gas distributing nozzle, 24, is in the form of a straight slit, 25. The collecting or baffle plate, 26, consists of an inclined flat plate while the liquid inlet from the constant level supply chamber, 27, may consist of a narrow slit, 28, which will allow the liquid to be discharged upon and flow over plate, 26, in a thin film or sheet. The incoming gases emanating in a thin blast from the flat nozzle orifice, 25, impinge at an oblique angle upon the collecting plate, 26, then, after releasing to the liquid flowing over baffle, 26, the particles of foreign matter which entered with them are deflected outwardly into the vessel or container, 20, and do not again interfere with or enter the incoming stream of gases.

The particles of foreign matter which are detained by the liquid flowing over the collecting surface, 26, are deposited with the liquid in the lower portion, 29, of the container, 20, which constitutes a catch basin for these materials. An overflow pipe, 30, may be provided and it may discharge into a receptacle provided with a liquid seal similar to the receptacle 13 shown in Fig. 1. Suitable clean-out doors may also be provided in the vessel or container, 20. The intake pipe or duct, 31, may be connected by any suitable means to the source of supply of uncleaned gas and the cleaned gases may be conducted through the outlet or discharge pipe, 32, to any desired point.

In case it is desired to separate a gas from a mixture thereof with one or more gases a liquid which is either a collector or has a chemical affinity for one of the gases should be employed. The operation of the apparatus in this case is similar in every respect to the operation for the separation of solid foreign materials from a mixture thereof with gas.

In case it is desired to collect and recover a single gas a suitable liquid which is either a collector or has a chemical affinity for the gas should be employed as above described. Likewise chemical vapors and other gases may be introduced through either or both of the distributing nozzles where chemical reactions are desired instead of or together with the mechanical combination of the substances introduced.

It will be understood that in order to prevent such accumulation of pressure in chamber 1 as would cause eddies and cross-currents at the exit 5 of the distributer-nozzle, the outlet 16 must have a greater capacity than said gas-distributer-nozzle.

Having thus described my invention I claim:

1. In an apparatus of the class described, a closed vessel provided with a gas-inlet, a gas-outlet, a liquid-inlet, and a liquid-outlet, a liquid-distributer connected to said liquid-inlet adapted to deliver liquid upon a surface interior of said vessel, and a gas-distributer connected to said gas-inlet and constructed to direct a current of gas in the form of a thin blast upon said surface, said gas-outlet having a greater capacity than said gas-distributer, to thereby prevent accumulation of pressure in said closed vessel.

2. In apparatus of the class described, a container, a gas distributer therein, an inlet pipe for conducting gas to said distributer, a baffle plate beneath said gas distributer, said gas distributer consisting of a conical shell having its small end connected to said inlet pipe, a conical member within said conical shell disposed so as to form an annular space or nozzle around the lower edge of said conical shell adapted to direct gas in a thin blast upon said baffle plate, and means for causing liquid to flow over said baffle plate.

3. In apparatus of the class described, a container, a gas distributer therein, an inlet pipe for conducting gas to said distributer, a baffle plate beneath said gas distributer, said gas distributer consisting of a conical shell having its small end connected to said inlet pipe, a conical member within said conical shell disposed so as to form an annular space or nozzle around the lower edge of said conical shell adapted to direct gas in a thin blast upon said baffle plate, and means for causing liquid to flow over said baffle plate the lower portion of said container being adapted to collect said liquid, said container having a gas outlet above said baffle plate and a liquid outlet below said baffle plate said liquid outlet being adapted to maintain the liquid at a constant level in said container.

4. In apparatus of the class described, a container, a gas distributer therein, an inlet pipe for conducting gas to said distributer, an inclined baffle plate beneath said distributer, said distributer together with said gas-inlet pipe forming a narrow annular slit adapted to direct a thin blast of gas upon said baffle plate at an oblique angle thereto, and means for causing liquid to flow over said baffle plate.

In testimony whereof I affix my signature.

GERARDUS JACOBUS ULRICI.